(12) United States Patent
Hammer

(10) Patent No.: US 6,766,778 B2
(45) Date of Patent: Jul. 27, 2004

(54) VALVE MECHANISM WITH A VARIABLE VALVE OPENING CROSS-SECTION

(75) Inventor: Uwe Hammer, Hemmingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/399,662

(22) PCT Filed: Apr. 12, 2002

(86) PCT No.: PCT/DE02/01364
§ 371 (c)(1),
(2), (4) Date: Aug. 27, 2003

(87) PCT Pub. No.: WO03/018966
PCT Pub. Date: Mar. 6, 2003

(65) Prior Publication Data
US 2004/0025820 A1 Feb. 12, 2004

(30) Foreign Application Priority Data
Aug. 21, 2001 (DE) .......................................... 101 40 952

(51) Int. Cl.$^7$ .................................................. F01L 1/14
(52) U.S. Cl. ............................... 123/90.48; 123/90.16; 123/90.52
(58) Field of Search ........................... 123/90.16, 90.17, 123/90.48, 90.49, 90.52, 188.1, 188.2, 188.5, 190.17, 188.9, 188.12, 188.17, 65 V, 65 VA, 65 D, 65 SP

(56) References Cited

U.S. PATENT DOCUMENTS

| 5,351,662 | A | * | 10/1994 | Dopson et al. | ........... | 123/90.16 |
| 6,293,239 | B1 | * | 9/2001 | Herbst | ...................... | 123/90.16 |

FOREIGN PATENT DOCUMENTS

| DE | 26 12 430 A1 | 3/1976 |
| DE | 26 36 519 A1 | 8/1976 |
| GB | 2 248 471 A | 10/1990 |
| JP | 08-189319 | 7/1996 |

* cited by examiner

Primary Examiner—Thomas Denion
Assistant Examiner—Ching Chang
(74) Attorney, Agent, or Firm—Ronald E. Greigg

(57) ABSTRACT

The invention relates to a valve mechanism with a variable valve opening cross section for use in an internal combustion engine and having a gas exchange valve acted on by the force of a valve spring and displaceable axially back and forth inside a guide by a valve control unit; the position of the sealing slide relative to the gas exchange valve in the axial direction is continuously variable by means of an adjusting unit. A sealing slide disposed coaxially to the gas exchange valve, is acted upon by the force of a coupling spring, and is displaceable axially back and forth by the valve control unit. The position of the sealing slide is variable in the axial direction relative to the gas exchange valve by means of an adjusting unit.

21 Claims, 15 Drawing Sheets

VALVE MECHANISM WITH A VARIABLE VALVE OPENING CROSS-SECTION

CROSS-REFERENCE TO RELATE APPLICATIONS

This application is a 35 USC 371 application of PCT/DE 02/01364 filed on Apr. 12, 2002.

BACKGROUND OF THE INVENTION

1. Field of the Invention

The invention relates to a valve mechanism with a variable valve opening cross section, and particularly to such a valve for use as an intake valve or exhaust valve of an internal combustion engine.

2. Prior Art

In internal combustion engines used as driving engine for motor vehicles, a fuel-air mixture is compressed and ignited in the work chamber. The energy produced is converted into mechanical work. It is known for air or the fuel-air mixture to be delivered to the work chamber via valves (inlet valves), and for the products of combustion to be removed from the work chamber via valves (outlet valves). For determining the efficiency of the engine, controlling these valves is of great significance. In particular, the gas exchange in the work chamber is controlled by way of controlling the valves.

In addition to camshaft control, it is also known to employ an electrohydraulic valve control. Electrohydraulic valve control offers the capability of variable or fully variable valve control, making it possible to optimize the gas exchange and thus to enhance the motor efficiency of the engine.

The electrohydraulic valve control includes a hydraulically actuatable control valve, whose control valve piston actuates a valve body of the inlet and outlet valves and leads to a valve seat (valve seat ring) (closure of the valve) or moves away from it (opening of the valve). The control valve can be actuated via a pressure control of a hydraulic medium. The pressure control is effected here via magnet valves incorporated into the hydraulic circuit. To achieve the most optimal possible gas exchanges, the highest possible switching speeds of the control valve are needed. As a result of these high switching speeds, the valve body of the inlet and outlet valves strikes the valve seat ring at high speed. The result is on the one hand noise, and on the other, the partners in the valve suffer relatively high wear.

European Patent Disclosure EP 0 455 761 B1, for instance, has a hydraulic valve control device for an internal combustion engine as its subject. The fundamental technological principle of this embodiment is to displace a motor valve by means of a controlled pressure of a hydraulic fluid. In this embodiment, it is provided that an electronic control unit triggers a magnet valve, which in turn controls the motion of a storage piston, by way of which the stroke of the motor valve is varied.

European Patent Disclosure EP 0 512 698 A1 describes an adjustable valve system for an internal combustion engine. This embodiment is one example of mechanical valve control via cams of a rotating camshaft.

U.S. Pat. No. 4,777,915 has an electromagnetic valve control system for an internal combustion engine as its subject. A similar embodiment of an electromagnetic valve control is known from EP 0 471 614 A1. In these embodiments, the valve is moved back and forth to different positions by electromagnetic force. The electromagnets are disposed inside a housing part of the cylinder head, in two different regions. By the alternating activation of the electromagnets, the valve is moved alternatingly into two terminal positions, corresponding to the opening and closing positions of the valve, respectively. In these terminal positions of the valve, the admission opening for the fuel-air mixture into the combustion chamber is then opened to the widest extent or completely closed.

Another embodiment is known from EP 0 551 271 B1. This embodiment involves a valve mechanism with a plate valve, which is disposed in a passage of an internal combustion engine. The fundamental principle of this embodiment is that the valve plate is divided into two parts; one half of the valve plate executes only a fraction of the stroke executed by the other half of the valve plate.

In these known embodiments for valve control, the major effort of production and assembly of the valve mechanism, because of its complicated design, is especially disadvantageous. This adversely affects the costs for production and assembly. Moreover, in these embodiments, extremely high speeds and strong forces for valve control are necessary, so that an increased vulnerability to malfunction of the valve control from major wear of the parts of the valve mechanism is unavoidable.

SUMMARY OF THE INVENTION

The valve mechanism of the invention offers the advantage over the prior art of creating a variable valve opening cross section by simple means. Because a sealing slide is disposed coaxially to the gas exchange valve is acted upon by the force of a coupling spring, and is displaceable axially back and forth by the valve control unit, and because the position of the sealing slide relative to the gas exchange valve in the axial direction is variable by an adjusting unit, which essentially comprises a control slide that is adjustable in the axial direction of the gas exchange valve and is disposed coaxially to the gas exchange valve and to the sealing slide, a valve mechanism is created which has a simple design and which functions reliably and durably. The advantage of the valve mechanism of the invention is in particular that a variable valve opening cross section can be created, and each individual valve can be regulated separately. With the valve mechanism of the invention, the variable valve opening cross section can advantageously be created without high speeds and without strong forces, so that the vulnerability of this valve mechanism to malfunction is very slight. The valve mechanism of the invention can be produced and assembled economically, because of its simple design. The invention advantageously creates a variable valve control by which optimization of the gas exchange and thus an increase in motor efficiency of the engine is possible.

In a preferred feature of the invention, it is provided that the valve control unit is a camshaft.

In a further preferred feature of the invention, it is provided that the gas exchange valve has a rotationally symmetrical basic construction and comprises a valve shaft, on whose lower end a valve plate is disposed.

In a further preferred feature of the invention, it is provided that the valve plate has a conical circumferential face, which forms the sealing seat of the gas exchange valve.

Also in a preferred feature of the invention, it is provided that in the closing position of the valve mechanism, the sealing seat of the gas exchange valve directly contacts both a sealing seat of the sealing slide and a valve seat ring of the cylinder head.

Moreover, in a preferred feature of the invention, it is provided that the sealing slide comprises a bushlike bearing body, which is disposed displaceably axially back and forth inside a guide of the cylinder head.

As a result of these advantageous features of the invention, the delivery of the air, or the fuel-air mixture, can be regulated with great precision, and a high efficiency of the engine can thus be achieved.

Moreover, in a preferred feature of the invention, it is provided that the control slide is connected via a male thread to a corresponding female thread of a gear wheel, surrounding it, that is connected to a rack by which a longitudinal motion can be executed. The particular advantage of this preferred feature of the invention is that with it, a very economical embodiment is created, which advantageously makes it possible for all the inlet and/or outlet valves of an internal combustion engine to be regulated in common via a single component. Triggering a plurality of control slides via this component creates the precondition that allows the control system of the engine to work with only a single sensor.

Moreover, in a preferred feature of the invention, it is provided that associated with the control slide is a securing disk, by way of which the control slide is adjustable in the axial direction. As a result, it is advantageously possible to calibrate the positions of the control slide of an internal combustion engine exactly by compensating for existing tolerances. The individual work cylinders of an engine can be adapted precisely to one another in their function in this simple and advantageous way, and thus an optimal efficiency of the engine can be achieved.

BRIEF DESCRIPTION OF THE DRAWINGS

Further advantageous features of the invention will become apparent from the detailed description contained herein below, taken in conjunction with the drawings, in which.

DESCRIPTION OF THE PREFERRED EMBODIMENT

Figure 1:
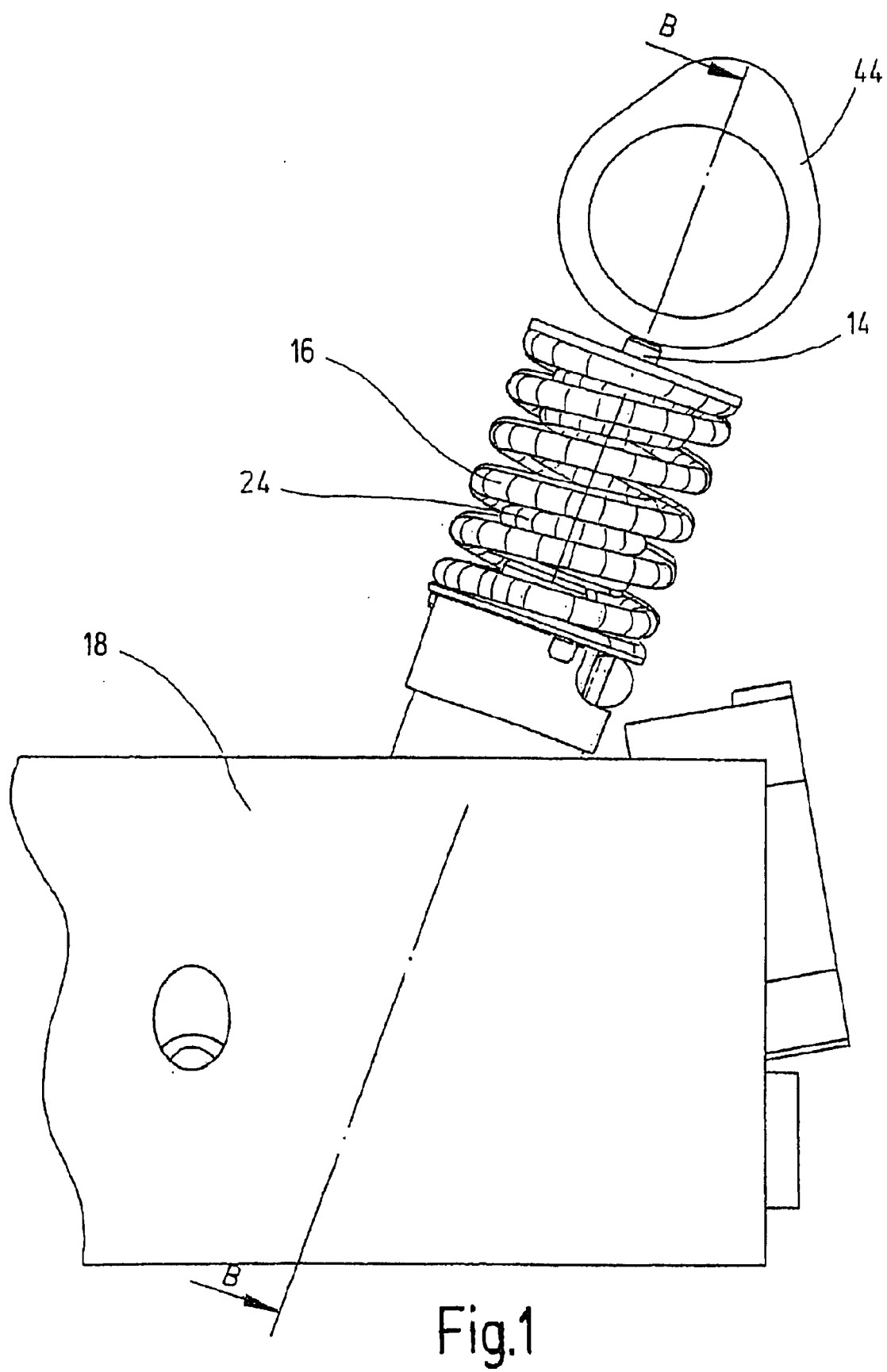
FIG. 1 is a side view of the valve mechanism of the invention, with a camshaft.

In the fifteen drawing figures, the individual parts of the valve mechanism of the invention are shown schematically and only with those components essential to the invention. Identical parts of the valve mechanism of the invention are identified by the same reference numerals throughout the drawings and as a rule will each be described only once.

Figure 2:
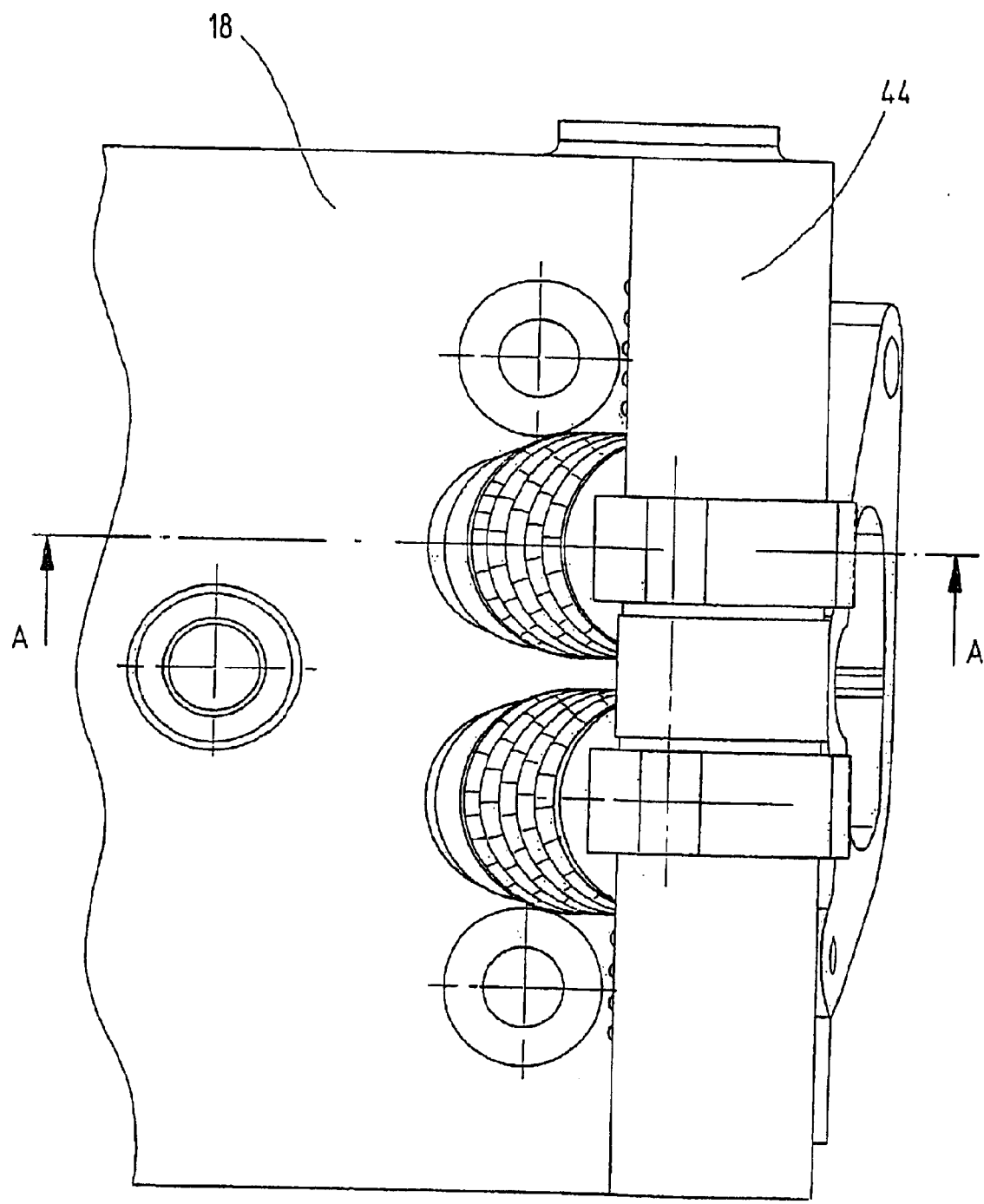
FIG. 2 is a plan view on the valve mechanism of the invention and the camshaft of FIG. 1.

In FIGS. 1 and 2, the valve mechanism of the invention, with a camshaft 44 as the valve control unit, is shown in a side view and a plan view, respectively, in its disposition on the cylinder head 18 of an internal combustion engine. In FIG. 2, two cams are disposed on the camshaft 44, by each of which the axial displacement motion of one gas exchange valve 12 is controlled.

Figure 3:
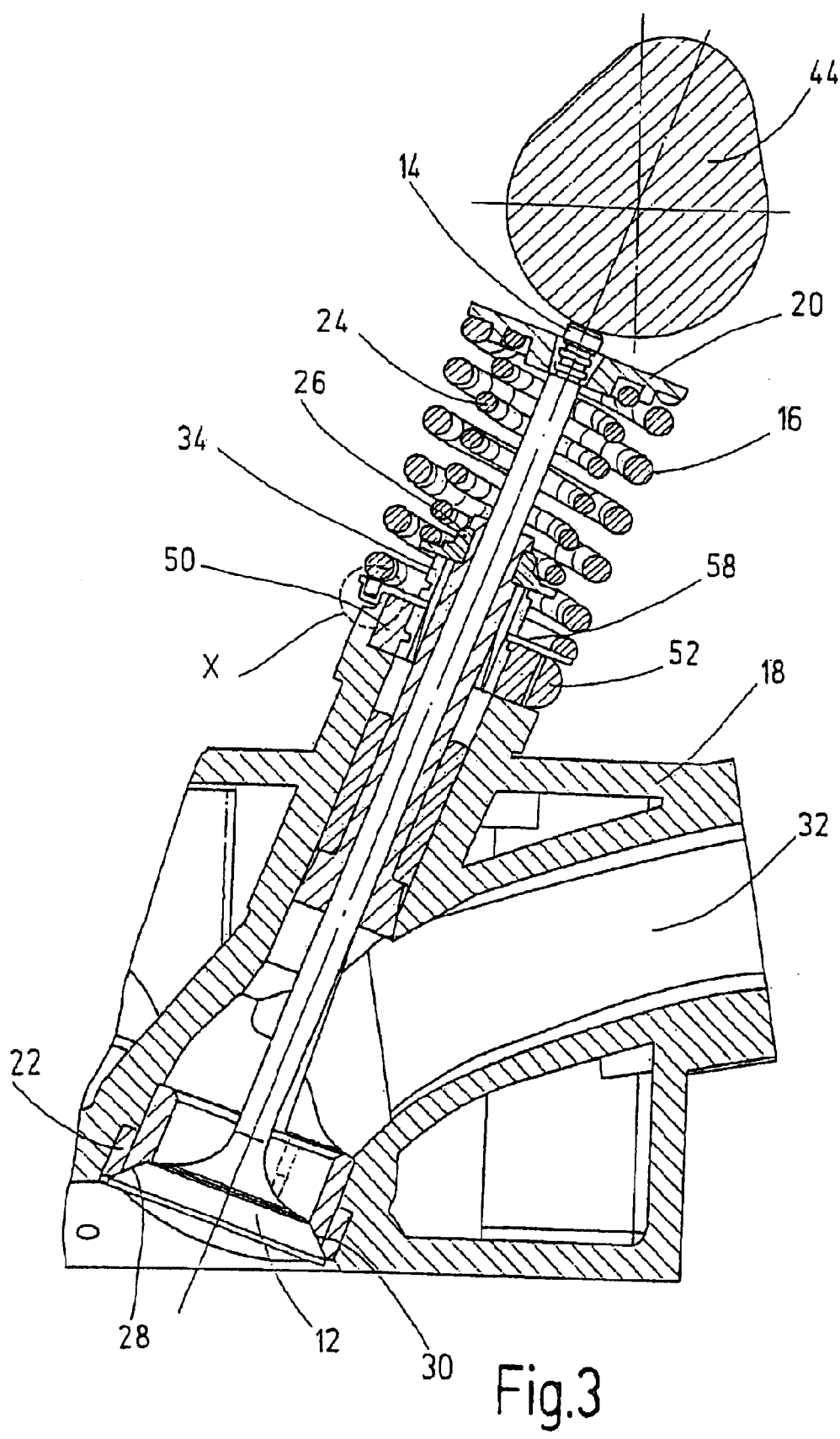
FIG. 3 is a section taken along the line A—A in FIG. 2 through a cylinder head with the valve mechanism of the invention and with a camshaft, involving a first exemplary embodiment of the invention.

FIG. 3 shows the valve mechanism of the invention with its essential components in a sectional view of a first exemplary embodiment of the invention. The valve mechanism has a gas exchange valve 12, which is acted upon by the force of a valve spring 16. The gas exchange valve 12 is displaceable axially back and forth inside a guide, and the displacement motion is generated by a valve control unit. In a preferred feature of the invention, a camshaft 44 is provided as the valve control unit.

The gas exchange valve 12 has a rotationally symmetrical basic construction and comprises a valve shaft 14, on the lower end of which a valve plate 20 is disposed. FIG. 3 shows the valve mechanism in the closing position of the gas exchange valve 12. The sealing seat 28 of the gas exchange valve 12 is in direct contact with both a sealing seat 30 of the sealing slide 10 and a valve seat ring 22 of the cylinder head 18.

The structure and mode of operation of gas exchange valves 12 per se are well known, so that this need not be addressed in further detail in the context of the present description.

The invention provides that a sealing slide 10 is disposed coaxially to the gas exchange valve 12. The sealing slide 10 is acted upon by the force of a coupling spring 24 and is displaceable axially back and forth. The displacement motion of the sealing slide 10 is likewise generated by the camshaft 44, by which the displacement motion of the gas exchange valve 12 is controlled.

Figure 15:
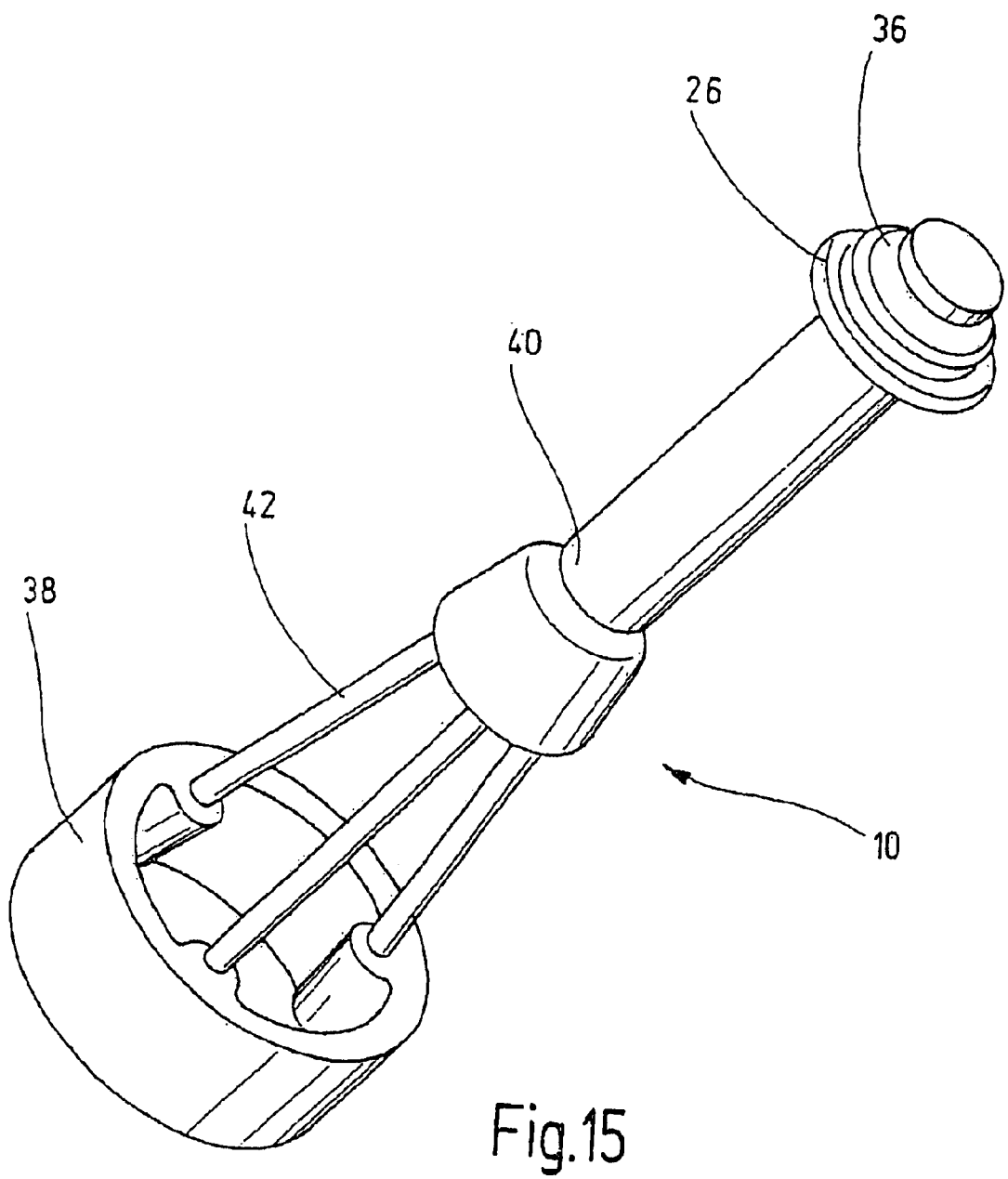
FIG. 15 is a perspective view of a sealing slide of the valve mechanism of the invention.

In FIG. 15, the sealing slide 10 is shown schematically in a perspective view. The sealing slide 10 substantially comprises a bearing body 40 and a sealing body 38. The bearing body 40 of the sealing slide 10 is embodied in bushlike fashion and is disposed displaceably axially back and forth inside a guide of the cylinder head 18. On its lower end, the sealing slide 10 has a cylindrical sealing body 38, whose outer face forms the sealing seat 30, and whose outer wall, together with the valve seat ring 22, forms an annular gap seal. The sealing body 38 is connected to the bearing body 40 via connecting rods 42.

A stop disk 26 is secured to the bearing body 40, near the lower end thereof. To facilitate assembly, this stop disk 26 comprises two parts. The two parts of the stop disk 26 are surrounded by a clamping ring 36, by which they are held together.

The connection between the sealing body 38 and the bearing body 40 is designed such that sufficient room remains for the air flowing through, or for the fuel-air mixture. As a result, for letting the air or the fuel-air mixture both in and out, there is advantageously a large enough admission opening inside the sealing slide 10 to allow this medium to flow through unhindered.

Figure 5:
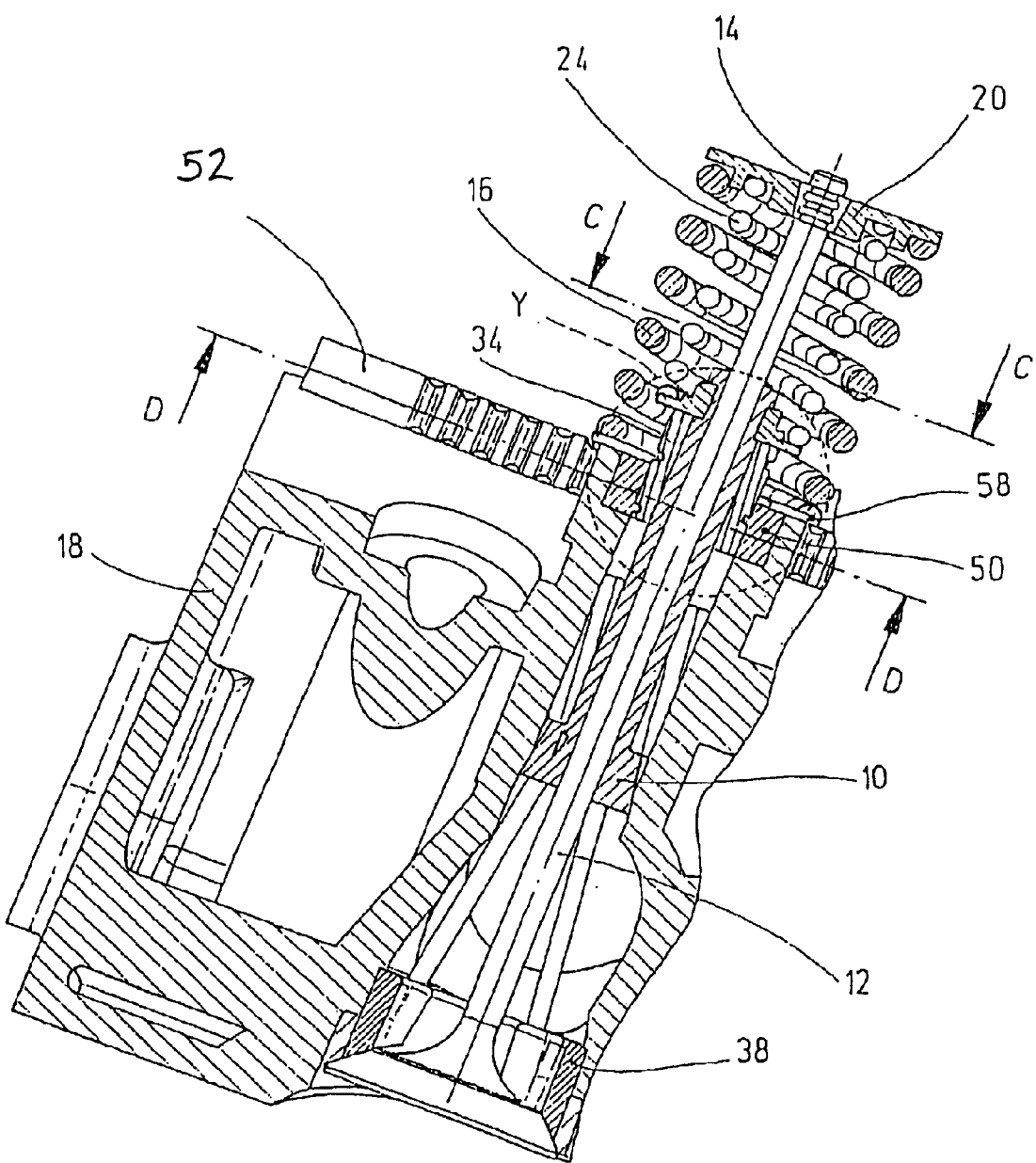
FIG. 5 is a section taken along the line B—B in FIG. 2 through a cylinder head with the valve mechanism of the invention and without the camshaft, involving a first exemplary embodiment of the invention.
Figure 8:
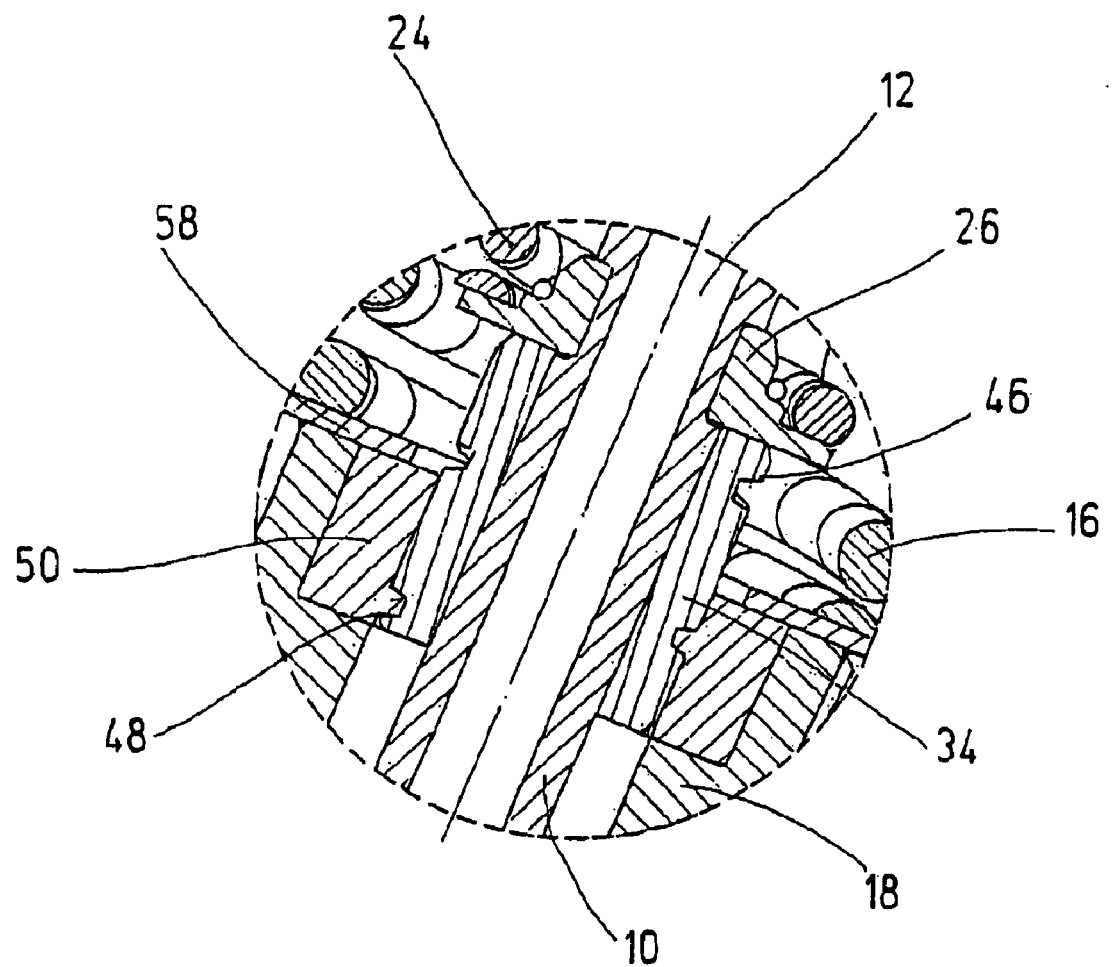
FIG. 8 is a detail Y of FIG. 5.

FIG. 8 shows a detail Y of FIG. 5. In this view, it can readily be seen that a control slide 34 is disposed coaxially to both the gas exchange valve 12 and the sealing slide 10. The control slide 34 (FIG. 9) is provided with a female thread by way of which it is connected to a corresponding male thread 48 of a gear wheel 50 surrounding it. A securing disk 58, by way of which the control slide 34 is calibratable in its position is disposed above the gear wheel 50.

FIG. 5 shows the disposition of a rack 52 on the valve mechanism that meshes with the gear wheel 50. The rack 52 is displaceable in its longitudinal direction and with its teeth 56 meshes with the teeth 54 of the gear wheel 50.

Figure 6:
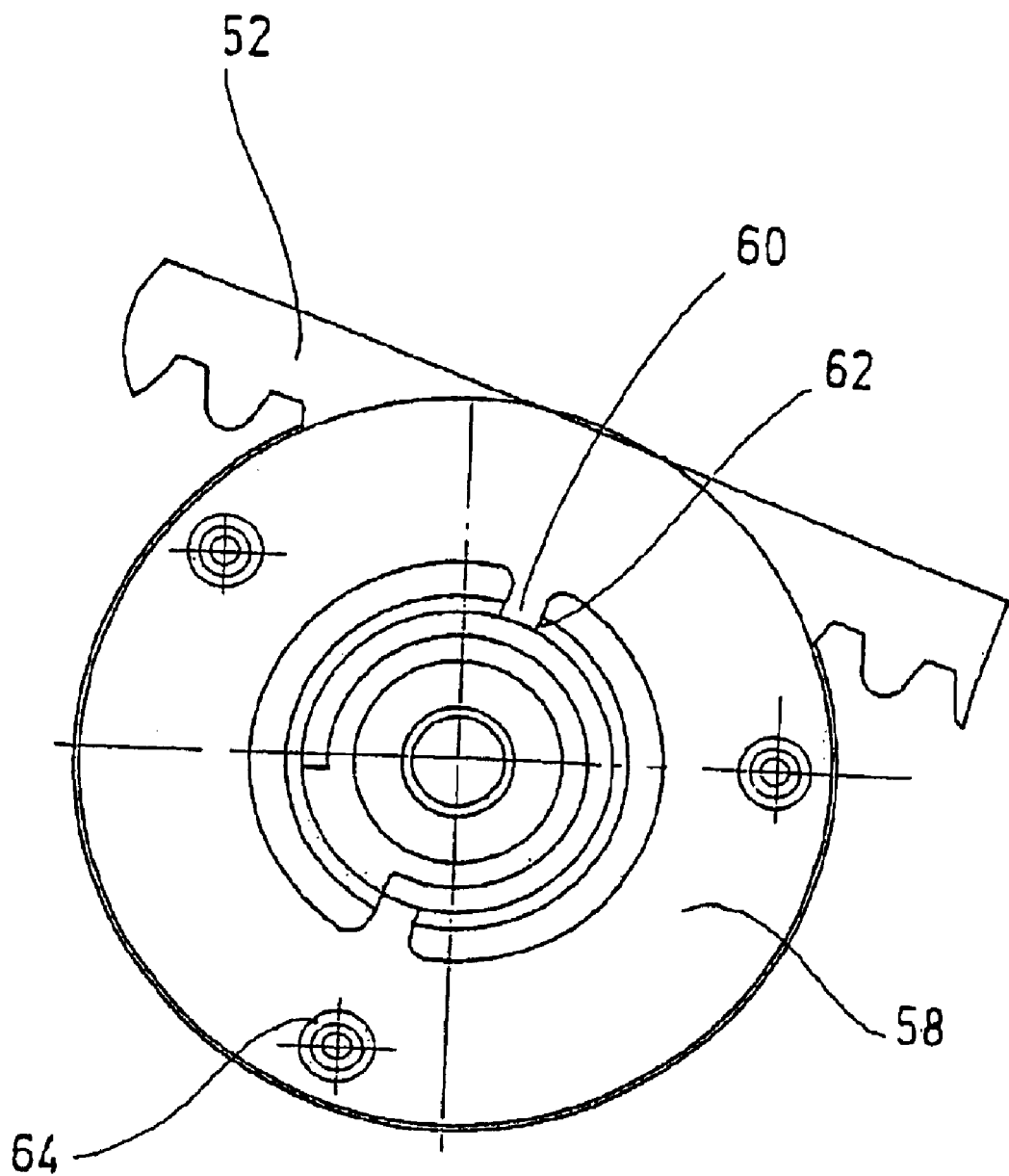
FIG. 6 is a section taken along the line C—C of FIG. 5.

FIG. 6, in a sectional view taken along the line C—C of FIG. 5, shows the engagement of the securing disk 58, via two respective ribs 60, with the corresponding grooves 62 of the control slide 34.

Figure 7:
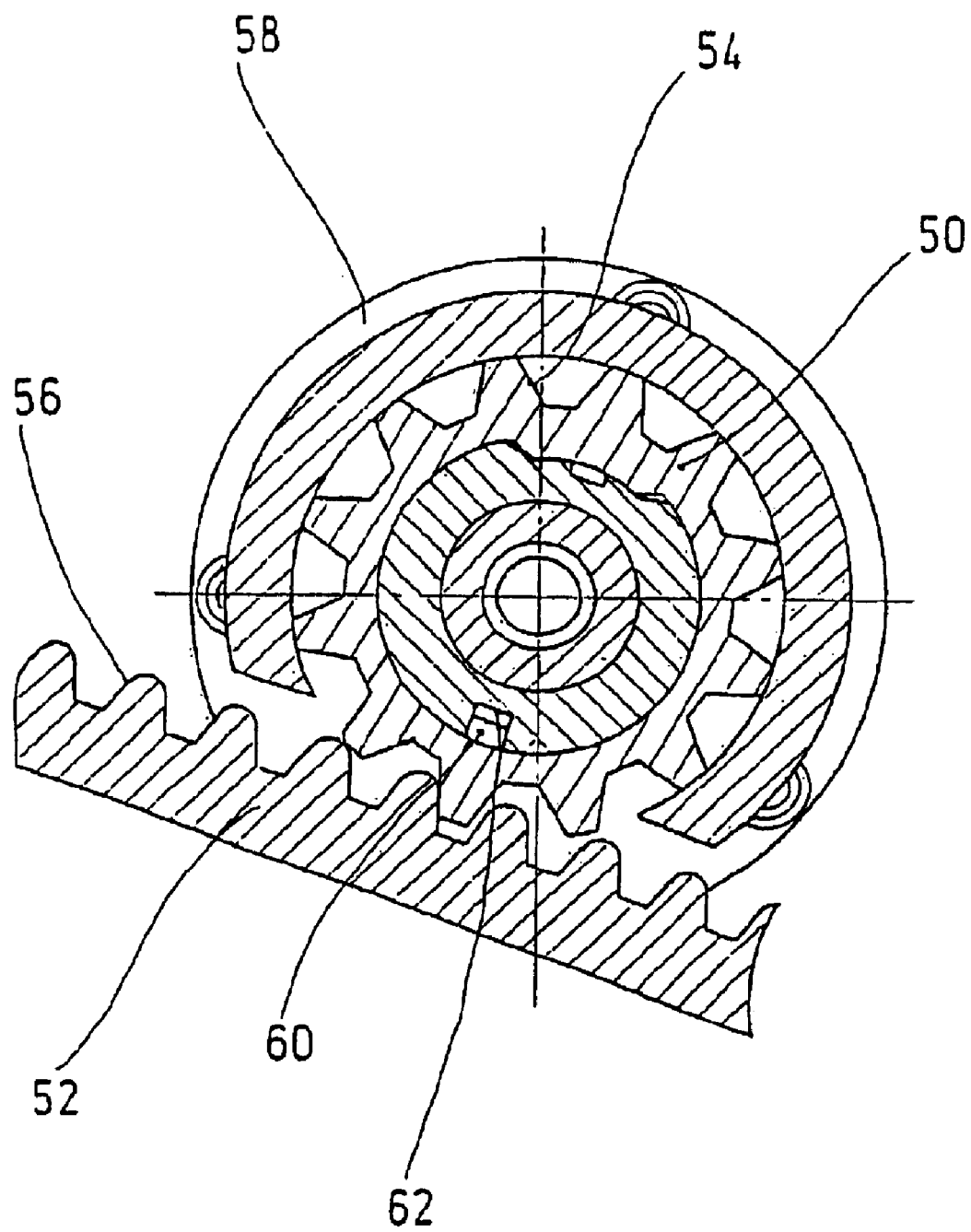
FIG. 7 is a section taken along the line D—D of FIG. 5.

FIG. 7, in a sectional view taken along the line D—D of FIG. 5, shows the meshing of the teeth 56 of the rack 52 with the teeth 54 of the gear wheel 50.

Figure 4:
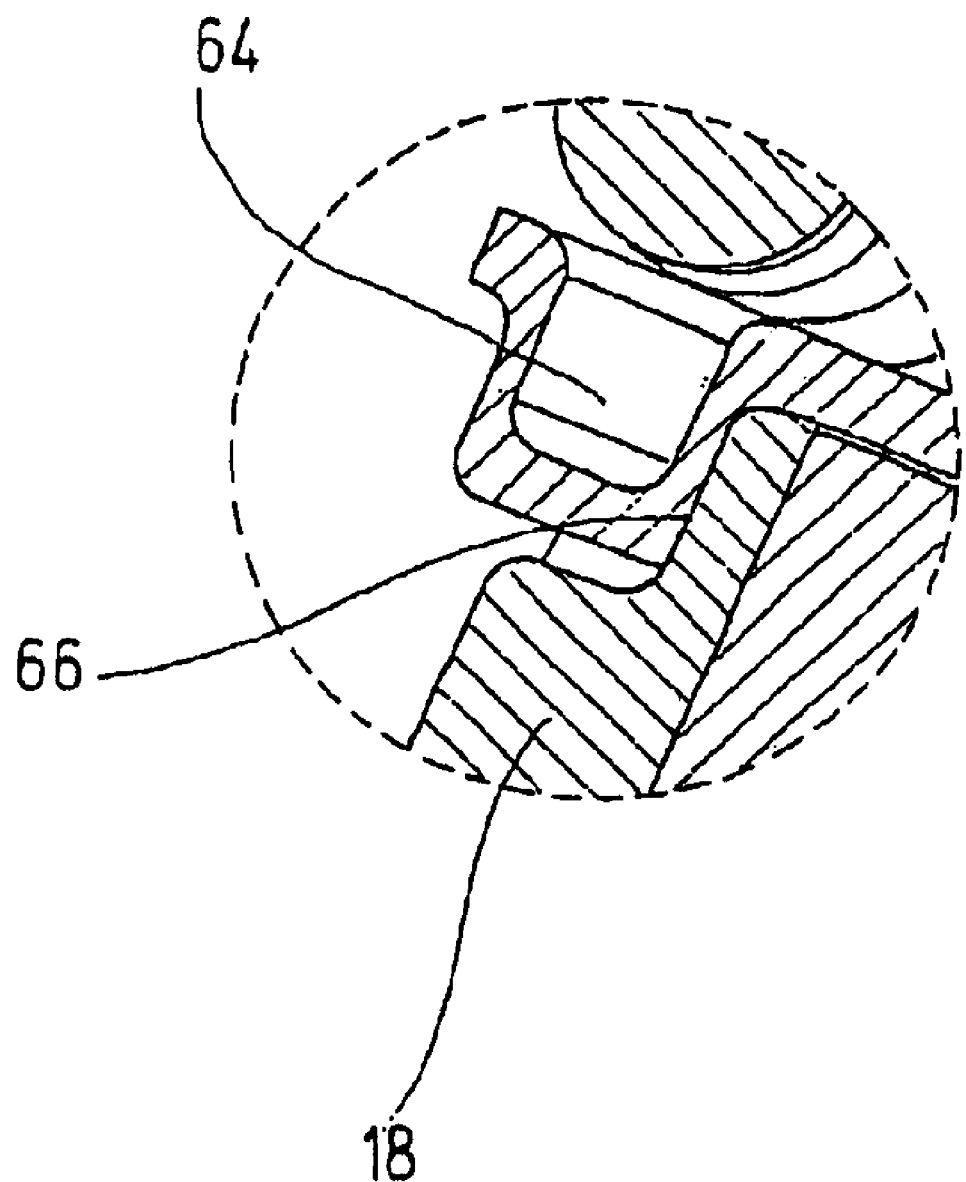
FIG. 4 is a detail X of FIG. 3.

FIG. 4, in a detail X of FIG. 3, shows a preferred feature of the invention, with which a rotationally fixed connection of the securing disk 58 with the housing of the cylinder head 18 can be established. The rotationally fixed connection is achieved with the aid of the shaping of bumps 64 on the securing disk 58, which protrude into bores 66 made in the housing of the cylinder head 18. In this simple and advantageous way, the securing disk 58 is connected in a rotationally fixed and secure manner to the housing of the cylinder head 18.

Figure 9:
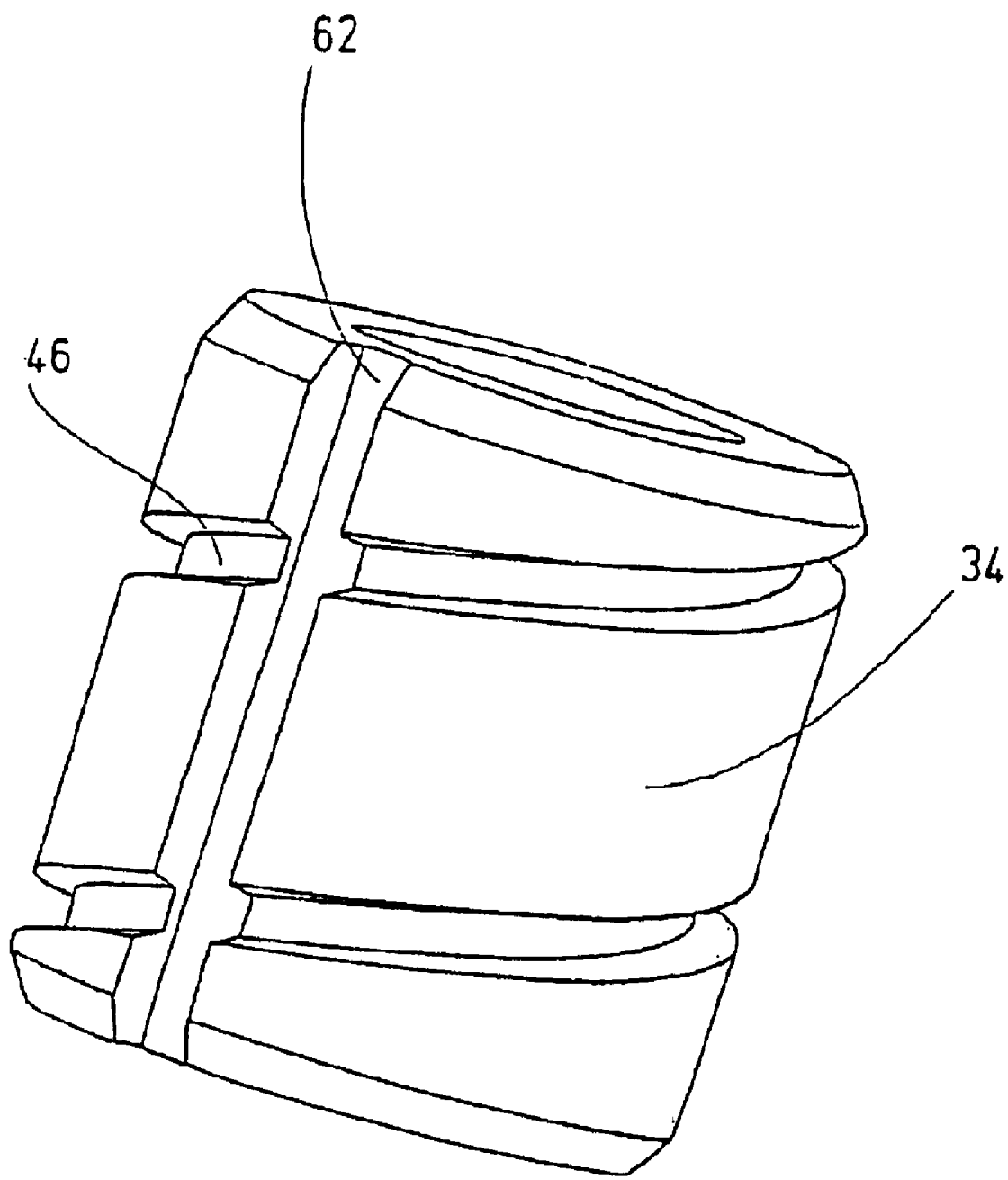
FIG. 9 is a perspective view of a control slide of the valve mechanism of the invention in a first exemplary embodiment of the invention.

In FIG. 9, the control slide 34 is shown in detail, in the first exemplary embodiment of the invention. The control slide 34 is embodied cylindrically, and a thread 46 with a relatively great pitch is machined into the outer face of its wall. Two continuous grooves 62 are also present, offset from one another by 180°, in the outer face of its wall, parallel to its center axis.

Figure 10:
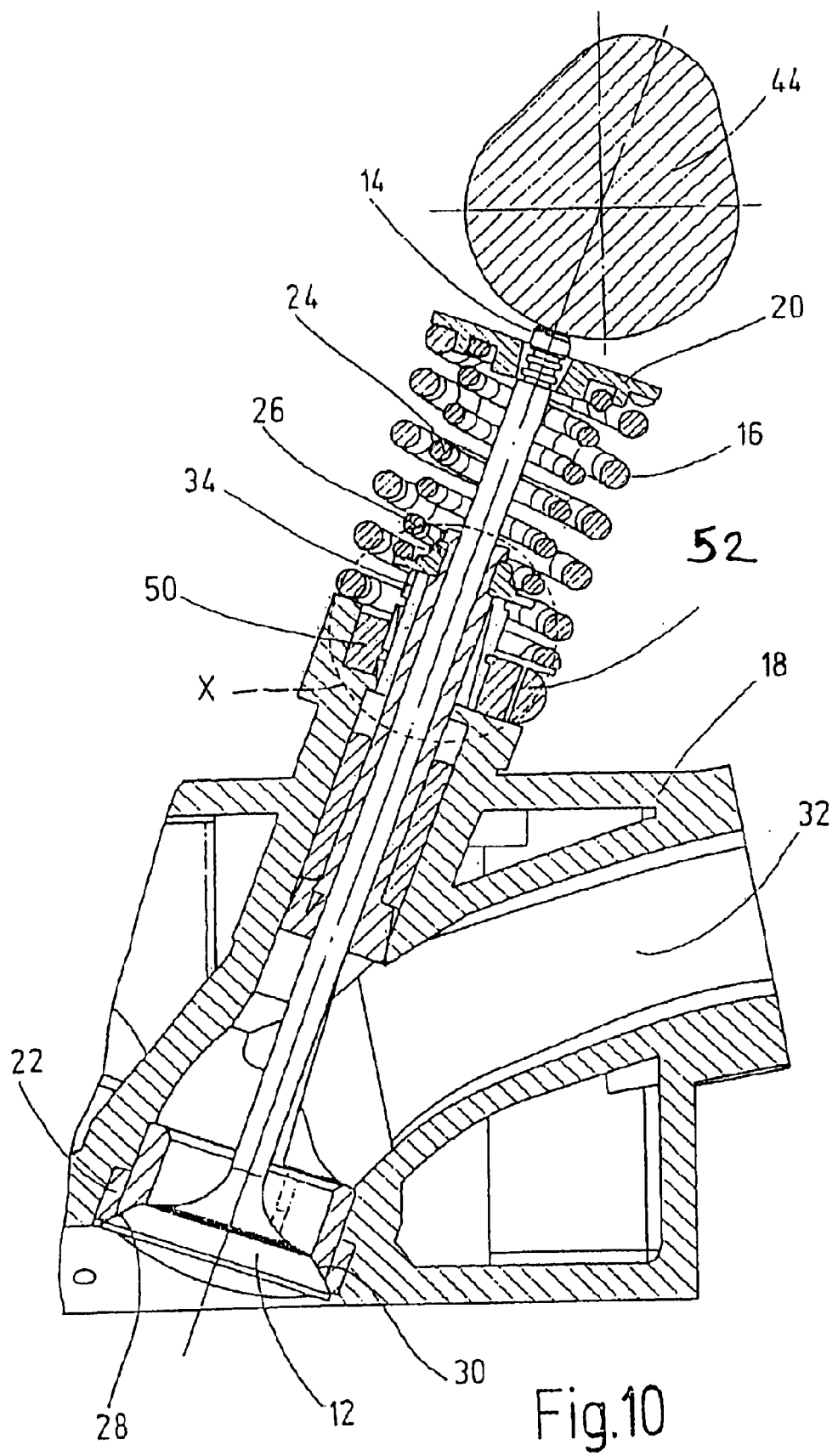
FIG. 10 is a section taken along the line A—A in FIG. 2 through a cylinder head with the valve mechanism of the invention and with a camshaft, involving a second exemplary embodiment of the invention.

FIG. 10 shows the valve mechanism of the invention with its essential components in a sectional view, for a second exemplary embodiment of the invention. The fundamental construction of the valve mechanism is analogous to the construction of the valve mechanism described for the first exemplary embodiment. Differences exist in certain details, which will be described below.

Figure 11:
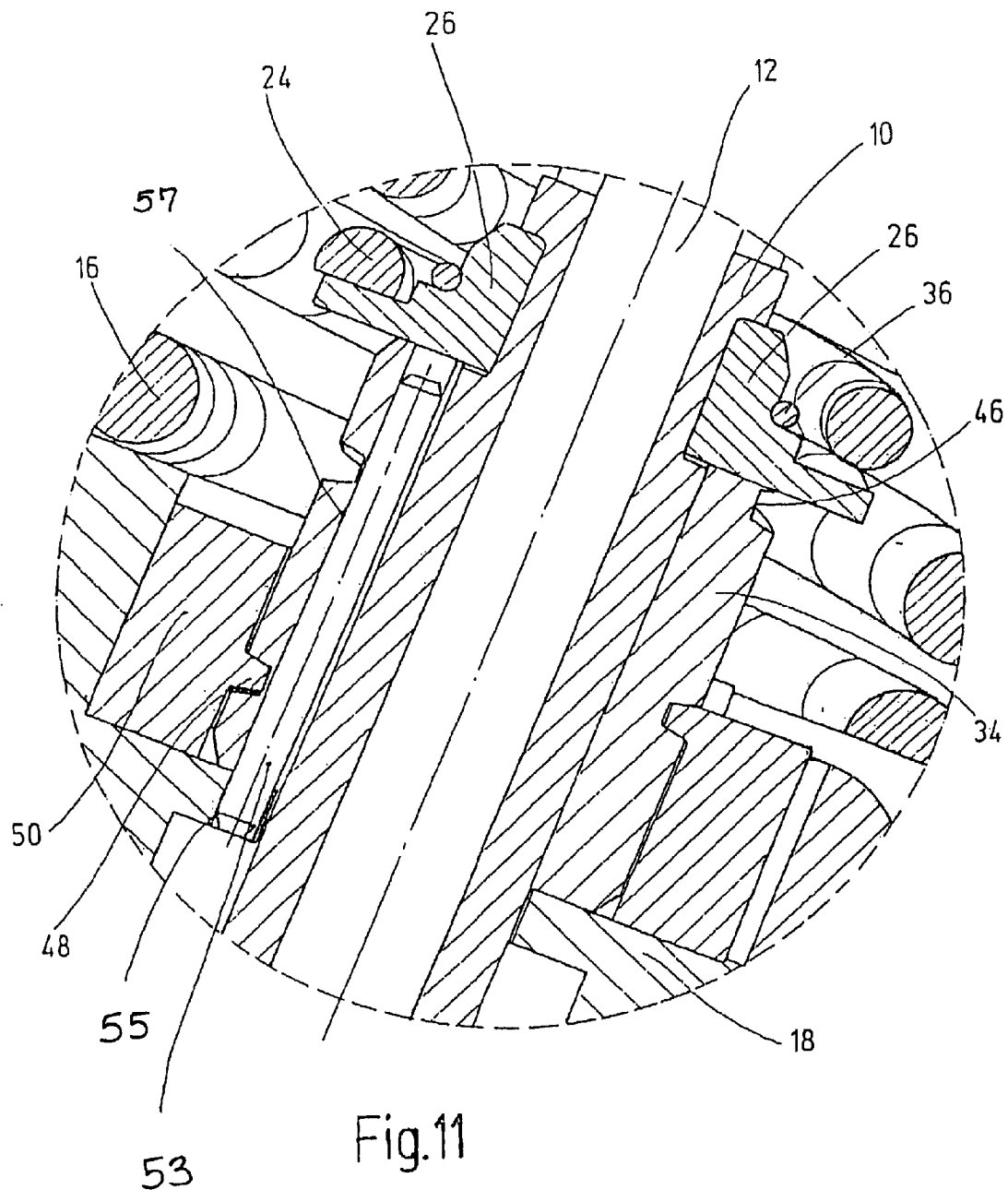
FIG. 11 is a detail X of FIG. 10.

FIG. 11 shows a detail X of FIG. 10. In this view, it can be clearly seen that there is a control slide 34 disposed coaxially to both the gas exchange valve 12 and the sealing slide 10. The control slide 34 (FIG. 14) is provided with a female thread 46, by way of which it is connected to a corresponding male thread 48 of a gear wheel 50 surrounding it. A bore 57 which receives a pin 53 is machined into the control slide 34. The pin 52 protrudes into a housing bore 55 of the cylinder head 18. In this simple and advantageous way, the control slide 34 is connected in a rotationally fixed way and securely to the housing of the cylinder head 18.

Figure 12:
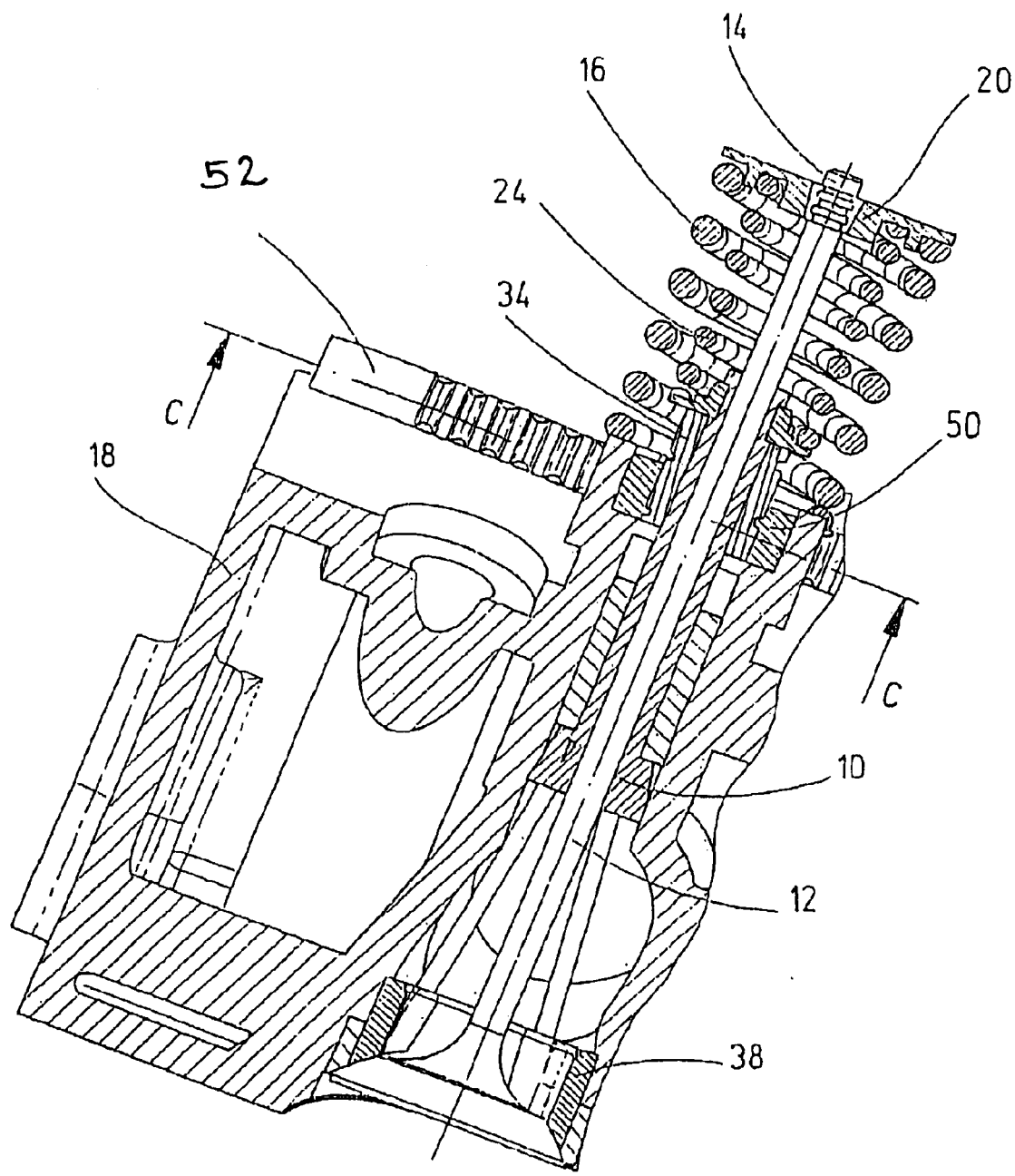
FIG. 12 is a section taken along the line B—B in FIG. 1 through a cylinder head with the valve mechanism of the invention and without the camshaft, involving a second exemplary embodiment of the invention.

FIG. 12 shows the disposition of a rack 52 on the valve mechanism that meshes with the gear wheel 50. The rack 52 is displaceable in its longitudinal direction and with its teeth 56 meshes with the teeth 54 of the gear wheel 50.

Figure 13:
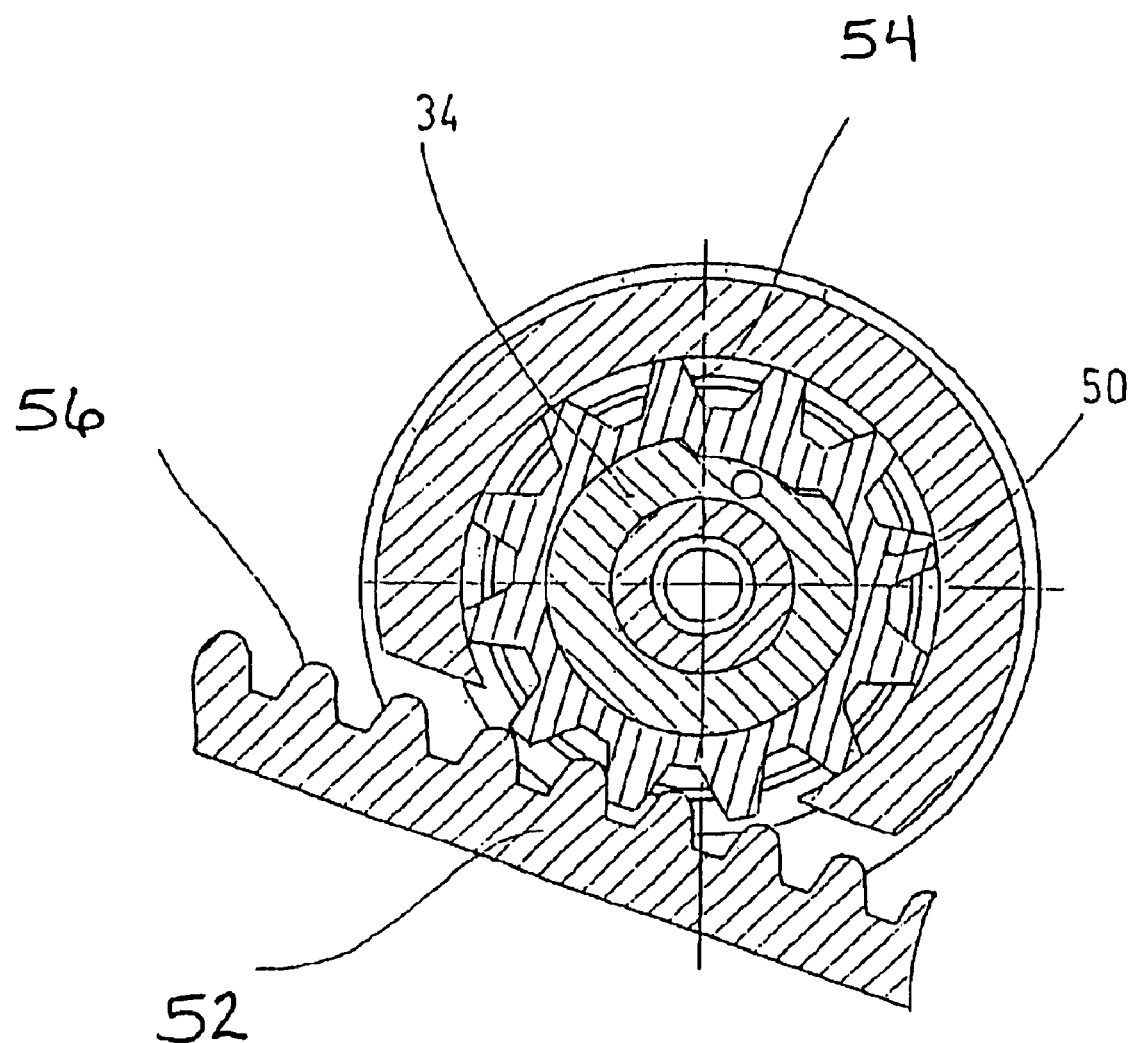
FIG. 13 is a section taken along the line C—C of FIG. 12.

FIG. 13, in a sectional view taken along the line D—D of FIG. 5, shows the meshing of the teeth 56 of the rack 52 with the teeth 54 of the gear wheel 50.

Figure 14:
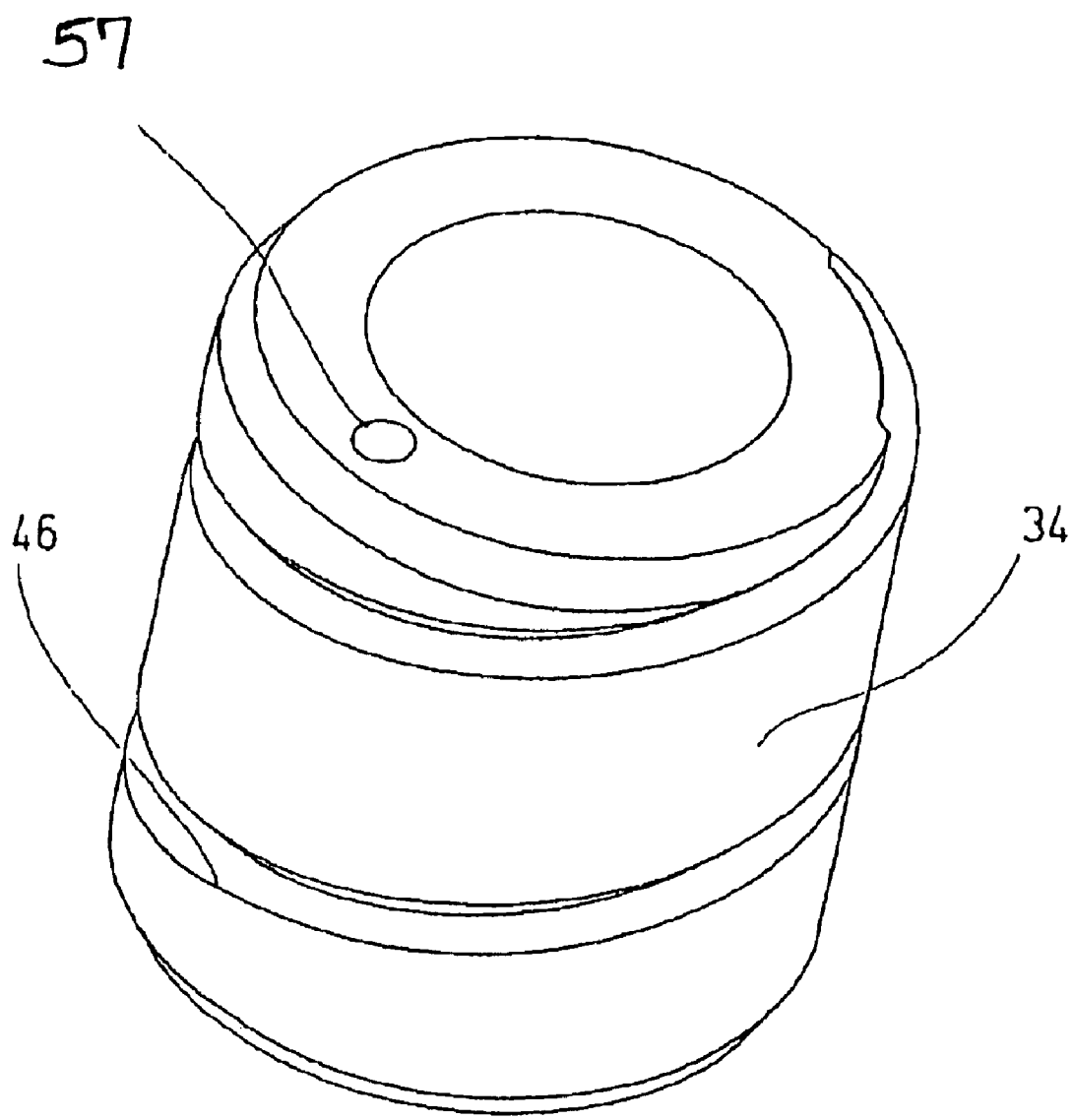
FIG. 14 is a perspective view of a control slide of the valve mechanism of the invention in a second exemplary embodiment of the invention.

In FIG. 14, the control slide 34 is shown in detail in the second exemplary embodiment of the invention. The control slide 34 is embodied cylindrically, and a thread 46 with a relatively great pitch is machined into its outer face. There is also a continuous bore 56 in its wall, parallel to its center axis.

The valve mechanism shown of the first exemplary embodiment of the invention has the following function:

By means of the valve control unit, which in a preferred feature of the invention is a camshaft 44, the gas exchange valve 12 can either be opened or closed. The gas exchange valve 12 is pressed downward on the valve shaft 14 via the camshaft 44, as in a conventional valve drive, the course of motion of the gas exchange valve 12 is thus controlled. All known methods that are based on the principle of the cup tappet, tilt lever, drag lever, and the like, can be employed.

The camshaft 44 operates counter to the restoring force of the valve spring 16 that is braced on the cylinder head 18 and on the valve plate 20 which moves jointly with the gas exchange valve 12. By rotation of the camshaft 44, the gas exchange valve 12 is pressed downward, and the sealing seat 28 of the gas exchange valve 12 lifts away from the valve seat ring 22.

Via the coupling spring 24, which is under a certain initial tension, the sealing slide 10 is moved in slaved fashion with valve 12. The coupling spring 24 is braced on the valve plate 20 and on the stop disk 26, which is connected to the sealing slide 10. As a result, the sealing seat 30 of the sealing slide 10 is pressed against the sealing seat 28 of the gas exchange valve 12. Since an annular gap seal exists between the sealing body 38 and the valve seat ring 22, only a very slight air quantity (leakage) can reach the combustion chamber from the manifold 32.

The gas exchange valve 12 and thus also the sealing slide 10 follow the cam course, until the stop disk 26 strikes the control slide 34.

The control slide 34 is adjustable in the axial direction of the valve shaft 14 in its outset position relative to the gas exchange valve 12. The control slide 34 can be adjusted via a suitable adjusting unit, two preferred embodiments of which are shown in detail in FIGS. 4–9 and 11–14. Otherwise, the position of the control slide 34 inside the valve mechanism remains fixed, even if forces are exerted on it from outside. The adjusting unit can each be actuatable electrically, hydraulically, or pneumatically.

As soon as the stop disk 26 strikes the control slide 34, the sealing slide 10 can no longer execute any motion in the opening direction of the gas exchange valve 12. Since the gas exchange valve 12 is moved onward by the camshaft, the sealing seat 28 of the gas exchange valve 12 lifts away from the sealing seat 30 of the sealing slide 10, and air can penetrate the combustion chamber. In the process, the coupling spring 24 is compressed.

If the gas exchange valve 12 follows the closing flank of the camshaft 44, it is pressed in the closing direction by the valve spring 16. The sealing seat 28 of the gas exchange valve 12 presses against the sealing seat 30 of the sealing slide 10. The sealing slide 10 is carried along, until the sealing seat 28 of the gas exchange valve 12 rests on the valve seat ring 22, and the gas exchange valve 12 is closed.

By axial displacement of the position of the control slide 34 via an adjusting unit, it can be established when the sealing seat 28 of the gas exchange valve 12 will lift from the sealing seat 30 of the sealing slide 10. In this advantageous way, the opening cross section of the gas exchange valve 12 and thus also the quantity of air reaching the combustion chamber 32 can be regulated.

The control slide 34 shown in FIG. 9 has a female thread 46 with a certain pitch. The male thread 48 of the gear wheel 50 engages the female thread 46 of the control slide 34.

In addition, a groove 62 is machined into the control slide 34 and is engaged by the strut 60 of the securing disk 58. When the securing disk 58 is connected to the housing of the cylinder head 18 in a rotationally fixed manner, a rotary motion of the gear wheel 50 is converted, via the thread 48, into a displacement motion of the control slide 34 in the axial direction. The rotary motion of the gear wheel 50 is generated with the aid of a longitudinal motion of the rack 52. The longitudinal motion of the rack 52 can be effected for instance via a hydraulic or pneumatic cylinder, or via an electric motor, which drives a gear wheel 50 that meshes with the teeth 56 of the rack 52.

By means of the invention, it is advantageously possible for the opening cross section of a plurality of gas exchange valves 12 to be regulated with one rack 52.

To compensate for system tolerances, such as the variations in height of the control slide 34, the securing disk 58 can be rotated, and at the same time the rack 52 is prevented from moving.

As a consequence of the rotary motion, because of the friction of the male thread 48, the gear wheel 50 will also execute a rotary motion, specifically until the teeth 54 of the gear wheel 50 contact the teeth 56 of the rack 52. Upon further rotation of the securing disk 58, the control slide 34 executes a reciprocating motion in the axial direction, since the rack 52 is prevented from moving longitudinally and thus the gear wheel 50 is prevented from rotating. The rotary motion of the securing disk 58 is continued until such time as the control slide 34 has assumed its intended position.

Next, a rotationally fixed connection is made between the securing disk 58 and the housing of the cylinder head 18. In the example shown (FIG. 4), the rotationally fixed connection is achieved with the aid of the shaping of bumps 64 on the securing disk 58, which protrude into bores 66 made in the housing of the cylinder head 18.

The valve mechanism of the second exemplary embodiment of the invention has the following function:

The fundamental mode of operation of the valve mechanism is analogous to the mode of operation of the valve mechanism described for the first exemplary embodiment. Differences exist in certain details, which are described below.

The control slide 34 of the adjusting unit shown in FIG. 14 has a female thread 46 with a certain pitch. The female thread 46 of the control slide 34 is engaged by the male thread 48 of the gear wheel 50. To achieve the function of the control slide 34, it is necessary to hinder it from making a rotary motion. This can for instance be done, as shown in FIG. 11, with the aid of a pin 52, which is guided in the housing bore 54 of the cylinder head and in the bore 56 of the control slide 34. If the gear wheel 50 executes a rotary motion, then because of the thread 46, the control slide 34 necessarily moves in the axial direction, since it is prevented by the pin 52 from making a rotary motion.

By means of a longitudinal motion of the rack 52, whose teeth 56 mesh with the teeth 60 of the gear wheel 50, a rotary motion of the gear wheel 50 and thus a displacement motion of the control slide 34 in the axial direction can be generated.

Thus by means of the longitudinal motion of the rack 58, the opening cross section of the gas exchange valve 12 can advantageously be regulated.

The longitudinal motion of the rack 52 can be effected for instance via a hydraulic or pneumatic cylinder, or via an electric motor, which drives a gear wheel 50 that meshes with the teeth 56 of the rack 52.

By means of the invention, it is advantageously possible for the opening cross section of a plurality of gas exchange valves 12 to be regulated with one rack 52. As a result, the embodiment according to the invention is especially economical.

The foregoing relates to preferred exemplary embodiments of the invention, it being understood that other variants and embodiments thereof are possible within the spirit and scope of the invention, the latter being defined by the appended claims.

What is claimed is:

1. In a valve mechanism with a variable valve opening cross section, in which the valve mechanism is disposed at an admission opening of an internal combustion engine and has a gas exchange valve, which is acted on by the force of a valve spring and is displaceable axially back and forth inside a guide by a valve control unit, the improvement comprising a sealing slide (10) disposed coaxially to the gas exchange valve (12), the sealing slide (10) being displaceable axially back and forth by the valve control unit, a coupling spring (24) acting on and applying a force to the sealing slide (10), the position of the sealing slide (10) relative to the gas exchange valve (12) being variable in the axial direction by an adjusting unit, the adjusting unit essentially comprising a control slide (34) adjustable in the axial direction of the gas exchange valve (12) and disposed coaxially to both the gas exchange valve (12) and the sealing slide (10), the control unit being operable to jointly trigger movement of the gas exchange valve (12) and the sealing slide (10).

2. The valve mechanism of claim 1, wherein the valve control unit comprises a camshaft (44).

3. The valve mechanism of claim 1, wherein the valve control unit comprises a camshaft (44), and wherein the gas exchange valve (12) has a rotationally symmetrical basic construction and comprises a valve shaft (14) having a valve plate (20) disposed on its lower end.

4. The valve mechanism of claim 3, wherein the valve plate (20) comprising a conical circumferential face, which forms the sealing seat (28) of the gas exchange valve (12).

5. The valve mechanism of claim 4, wherein, in the closing position of the valve mechanism, the sealing seat (28) of the gas exchange valve (12) directly contacts both a sealing seat (30) of the sealing slide (10) and a valve seat ring (22) of the cylinder head (18).

6. The valve mechanism of claim 1, wherein the sealing slide (10) comprises a bushlike bearing body (40) disposed displaceably axially back and forth inside a guide of the cylinder head (18).

7. The valve mechanism of claim 6, wherein the bushlike bearing body (40) of the sealing slide (10) forms the guide of the gas exchange valve (12), inside which the gas exchange valve (12) is displaceable axially back and forth.

8. The valve mechanism of claim 1, wherein the sealing slide (10) further comprising a cylindrical sealing body (38) on its lower end, the outer face of the sealing body forming the sealing seat (30).

9. The valve mechanism of claim 8, wherein the sealing body (38) is connected to the bearing body (40) via connecting rods (42).

10. The valve mechanism of claim 6, further comprising a stop disk (26) is secured to the bearing body (40) of the sealing slide, near its upper end.

11. The valve mechanism of claim 10, wherein the stop disk (26) comprises two parts.

12. The valve mechanism of claim 11, wherein the two parts of the stop disk (26) are surrounded by a clamping ring (36).

13. The valve mechanism of claim 1, wherein the control slide (34) is connected via a female thread (46) to a corresponding male thread (48) of a gear wheel (50), surrounding it, the gear wheel (50) being connected to a rack (58), by which a longitudinal motion can be executed.

14. The valve mechanism of claim 13, further comprising a hydraulic or pneumatic cylinder operable generate the longitudinal motion of the rack (58).

15. The valve mechanism of claim 13, further comprising an electric motor driving a gear wheel (50) that meshes with teeth (62) of the rack (58), to generate longitudinal motion of the rack (58).

16. The valve mechanism of claim 1, wherein the control slide (34) is connected via a female thread (46) to a corresponding male thread (48) of a gear wheel (50), surrounding it, the gear wheel (50) being connected to a rack (58), by which a longitudinal motion can be executed, and a securing disk (58) associated with the control slide (34) by way of which securing disk (58) the control slide (34) is adjustable in the axial direction.

17. The valve mechanism of claim 16, further comprising at least one strut (60) disposed on the securing disk (58) and in engagement with a groove (62) of the control slide (34).

18. The valve mechanism of claim 17, further comprising at least one bump (64), with which the securing disk (58) can be connected in rotationally fixed fashion to the housing of the cylinder head (18), the pump (54) being disposed on the securing disk (58).

19. The valve mechanism of claim 13, further comprising a bore (56) in the control slide (34), and a pin (52) received in the bore (56), which pin protrudes into a housing bore (54) of the cylinder head (18).

20. The valve mechanism of claim 13, further comprising a bore (56) in the control slide (34), and a pin (52) received in the bore (56), which pin protrudes into a housing bore (54) of the cylinder head (18).

21. The valve mechanism of claim 13, further comprising a bore (56) in the control slide (34), and a pin (52) received in the bore (56), which pin protrudes into a housing bore (54) of the cylinder head (18).

* * * * *